Jan. 5, 1965 E. L. GRONER ETAL 3,164,020
FLOWMETER
Filed Aug. 17, 1961

INVENTORS.
EDWARD L. GRONER
CHARLES L. BOYD
BY
*Lyon & Lyon*
ATTORNEYS.

3,164,020
FLOWMETER
Edward L. Groner and Charles L. Boyd, Duncan, Okla., assignors to Halliburton Company, Duncan, Okla., a corporation of Delaware
Filed Aug. 17, 1961, Ser. No. 132,181
6 Claims. (Cl. 73—231)

The present invention relates to improved means and techniques for measuring flow and is particularly useful in making accurate measurements of fluids carrying abrasives with a low pressure drop occasioned by the flow sensing means.

As described herein, the arrangement involves generally a flowmeter wherein a special rotor having a unique construction is employed. The rotor consists of a number of blades lying generally within the same plane but with a helical pitch so as to rotate when fluid flows through a conduit containing the rotor. These blades terminate at a peripheral shroud ring of magnetic material and containing a number of grooves desirably, but not necessarily, cut on a helical pitch so as to develop electrical impulses in a pick-up head as the grooves pass through a magnetic field created by the pick-up head.

Important features of the invention reside not only in the construction of the rotor but also in the means whereby the rotor is supported for rotation. Such means invlove the use of material sold, for example, under the trade name Carboloy or carbide material serving as bearings and a Carboloy or carbide material serving as bearings and a Carboloy or carbide ball mounted in the hub of stationary vanes on both the upstream and downstream sides, the vane structure serving to promote turbulent flow of fluid past the rotor. Another feature of the present invention involves the particular constructional features of the rotor, vanes and bearing structures in providing convenient and expeditious assembly and disassembly of these elements.

It is therefore an object of the present invention to provide improved means and techniques of the character indicated above.

A specific object of the present invention is to provide a flowmeter which has improved accuracy and the movable element of which produces a relatively small pressure drop in the flow of fluid being measured.

Another specific object of the present invention is to provide a flowmeter construction particularly suitable in measuring flow of fluids containing abrasives such as cement, sand-oil, crude-coke mixtures and the like.

Another specific object of the present invention is to provide an arrangement of this character in which the output of the flowmeter may be in the form of digital information.

Another object of the present invention is to provide an arrangement of this character adaptable for building in various sizes to accommodate flow rates over a relatively large range.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
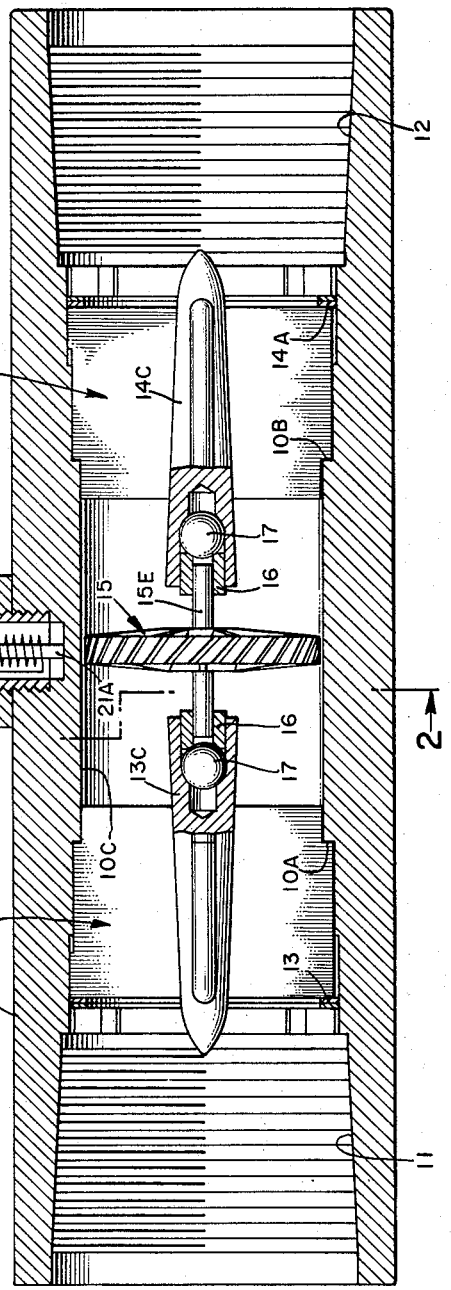
FIGURE 1 illustrates a flowmeter involving features of the present invention.

Referring to the drawings, FIGURE 1 illustrates a straight tubular body 10 of non-magnetic material having, for example, a tapped inlet opening 11 and a tapped outlet opening 12 for convenient connection into a fluid line in which fluid rates are to be measured.

A pair of vane structures 13 and 14 are stationarily retained in the body 10 by corresponding spring-type retaining rings 13A and 14A to maintain the vane structures 13 and 14 against corresponding annular shouldered portions 10A and 10B formed internally of the tubular body 10. Each of the vane structures 13 and 14 is of identical construction and may involve three or more vanes extending radially from hub portions 13C and 14C with which they are integrally formed. These vanes are generally for the purpose of producing turbulent flow past the rotor 15 which is approximately centrally positioned in the body 10 between the vane structures 13 and 14 with the outer peripheral portion of the rotor 15 being adjacent the cylindrical body wall 10C of smallest diameter, such cylindrical wall 10C extending between the two vane structures 13 and 14. The flow of fluids through the meter is generally turbulent and the vane structures 13 and 14 serve generally as straightening vanes for the turbulent flow much in the nature that straightening vanes serve in differential flowmeters.

Figure 3:
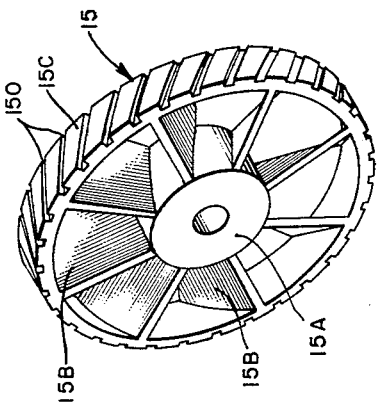
FIGURE 3 is a perspective view illustrating the rotor in FIGURE 1 without its shaft mounted thereon.
Figure 2:
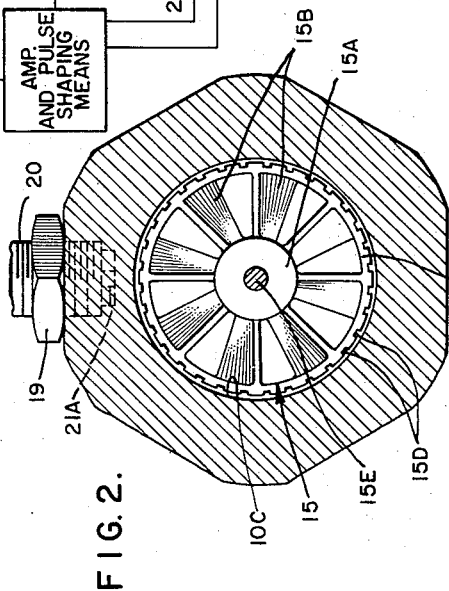
FIGURE 2 is a sectional view taken generally along the line 2—2 of FIGURE 1.

The rotor 15 is of special construction as shown in FIGURE 3 and has a centrally located hub portion 15A with blades 15B extending radially outwardly therefrom, such blades 15B being formed with a helical pitch so as to cause the rotor to rotate when fluid flows through the meter from the inlet opening 11 to the outlet opening 12. As also seen in FIGURE 3, these rotor blades are integrally formed with a shroud ring 15C of magnetic material and this shroud ring has one or more externally formed grooved portions 15D cut into the shroud ring 15C on a helical pitch which corresponds generally to the helical pitch of the blades 15B. While it is not necessary that these grooves be cut on a helical pitch, preferably they have some pitch to prevent or minimize shear of the fluids passing through the meter. In some cases the grooves may have no pitch, i.e. extend parallel to the axis of rotation. It will also be observed that the number of such blades 15D is in excess of the number of blades 15B, although not necessarily so since in some cases the number of grooves may be less than the number of blades 15B and indeed may be only one in number.

The rotor 15 is mounted for rotation in the stationary hub portions 13C and 14C in a unique manner now described. The rotor 15 has the shaft 15E secured to its hub portion 15A and the ends of such shaft 15E extend into special bearings mounted in the hubs 13C and 14C. Each of these bearings is of identical construction and involves a Carboloy or carbide bearing sleeve 16 rigidly secured in the ends of corresponding hub members 13C and 14C and within which such ends of shaft 15E rotate. The shaft 15E is also of a hard abrasive resistant material such as, for example, Carboloy or of carbide composition. The sleeve 16 also retains a Carboloy or carbide thrust ball 17 which is engageable with corresponding ends of the shaft 15E to accommodate thrust forces on the rotor 15. For this purpose each of the balls 17 engages a seat in the hub members 13C and 14C; such seat may, but not necessarily, conform in radius with the radius of the ball 17 and such balls may move freely on their corresponding seats or the balls may be fixedly mounted without permissible rotation. The purpose of these balls 17 is to provide low-friction, low-wear thrust bearings in connection with shaft 15E.

A magnetic pick-up head 18 is threaded into a radial tapped blind opening in the non-magnetic body 10 and is secured thereto by the threaded locking ring 19 which is threaded on the case 20 of the pick-up head. This case 20 has secured therein a permanent magnet 21 having a portion or pole piece 21A thereof of reduced diameter wound with a coil 23, the ends of the coil 23 being connected to corresponding contact member 24 and 25.

It will be seen that the magnetic flux produced by the permanent magnet 21 is altered when and as the grooved portions 15D of the rotor 15 are moved, i.e. rotated with respect to the pole piece 21A. Such movement results in a change in flux and this change in flux results in a voltage being induced in the coil 23, there being a change in voltage for each grooved portion 15D, i.e. a voltage is generated in response to each grooved portion 15D. This voltage appearing on the contacts 24 and 25 is applied to the input of an amplifying and pulse-shaping circuit or means 27. The pulse-shaping means serves generally to produce flat-type or square-type voltage waves. The output of the amplifying and pulse-shaping means 27 is applied to a frequency-dividing circuit 28 which serves to reduce the frequency of the square wave pulses by some predetermined factor, i.e. the frequency of the pulses may be reduced by a factor of 2 or more. The output pulses of the frequency divider stage may be applied to a counting device 31. By proper selection of the frequency divider stage 28, the counting device indicates accumulated total flow in any units as desired. The output pulses of the pulse-shaping circuit 27 are also applied to a D.C. converting stage 29 which serves to produce an output voltage which has a definite amplitude corresponding to the frequency of the input signals applied to stage 29. This D.C. output voltage is applied to the D.C. meter 30 which indicates the amplitude of such voltage to thereby provide an indication of the rate or frequency of pulses and thus the speed of rotation of the rotor 15.

It is seen that abrasive resistant of like carbide composition is used in the fabrication of shaft 15E, bearings 16 and thrust balls 17 and thus departs from the usual engineering practice in having one of the two members of a sleeve bearing of softer material to aid in lapping in and preventing galling.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a fluid measuring device of the character described, the combination comprising a tubular body through which fluid to be measured flows, said tubular body having two ends, a plurality of vane structures each insertable through corresponding ends of said body and abutting a shouldered portion of said body, each of said vane structures being secured against the corresponding shouldered portion of the body by releasable retaining means, each of said vane structures having a hub portion facing inwardly from a corresponding end of the body, each of said hub portions defining a cavity portion, a ball seated in said cavity portion, a sleeve bearing retained in said cavity portion and serving to retain said ball, a rotor between said hub portions and having its opposite ends extending into corresponding sleeve bearings in corresponding hub portions, said rotor having radially extending helical pitched blades, a continuous magnetizable shroud ring of magnetic material integrally formed and surrounding the outer portions of said blades, said shroud ring having at least one external grooved portion therein, a magnetic pick-up head mounted on said body and externally of said body, said body being of nonmagnetizable material, said magnetic pick-up head including a permanent magnet pole piece secured to said permanent magnet, a coil wound on said pole piece, and means connected to said coil and responsive to the change in magnetic flux occasioned by movement of said grooved portion or portions past said pole piece and producing an indication of the speed of said rotor.

2. In a flow-measuring device of the character described comprising a body through which the fluid to be measured flows, a rotor rotatably supported in said body, said rotor comprising a plurality of radially extending helically pitched blades, and a continuous magnetizable shroud ring encircling said blades and being rotatable therewith, said shroud ring having at least one external grooved portion, said body being of nonmagnetic material, a permanent magnetic structure mounted on said body and producing a magnetic field through said shroud ring, and a coil on said magnetic structure sensing the changes in magnetism effected by said grooved portion.

3. Apparatus of the character described for indicating rates of flow of fluid, including in combination: a generally cylindrical housing, a pair of vane structures, means retaining each of said vane structures in said housing, each of said vane structures having a solid hub portion axially aligned with said housing, each hub portion having an open-ended cavity portion in one end thereof, a pair of bearing balls each seated within a corresponding one of said hub cavity portions, a pair of bearing sleeves each fitted within a corresponding one of said cavity portions and each engaging and retaining a corresponding one of said balls in said cavity portion, a rotor, a shaft extending axially of said housing and mounting said rotor and having opposite ends thereof extending within and journalled in a corresponding one of said bearing sleeves and engageable with a corresponding one of said balls.

4. Apparatus as set forth in claim 3 in which said housing is of one-piece construction having spaced internally shouldered portions, said vane structures each engaging a corresponding one of said shouldered portions, and means releasably retaining each of said vane structures against a corresponding one of said shouldered portions, means on the ends of said housing for connecting the same in a flow line, and said releasable means being confined entirely within said housing.

5. Apparatus as set forth in claim 3 in which said shaft, bearing sleeves and balls are of Carboloy.

6. In a fluid measuring device of the character described, the combination comprising a tubular body through which fluid to be measured flows, said tubular body having two ends, a plurality of vane structures each insertable through corresponding ends of said body and abutting a shouldered portion of said body, each of said vane structures being secured against the corresponding shouldered portion of the body by releasable retaining means positioned entirely within said tubular body, each of said vane structures having a hub portion facing inwardly from a corresponding end of the body, each of said hub portions defining an open-ended cavity portion, a pair of balls each seated in a corresponding one of said cavity portions, a pair of sleeve bearings each retained in a corresponding one of said cavity portions and serving to retain a corresponding one of said balls, a rotor between said hub portions and having its opposite ends extending into corresponding ones of said sleeve bearings and engageable with a corresponding one of said balls, said rotor having radially extending helical pitched blades, a magnetic pick-up head mounted on said body and externally of said body, said body being of nonmagnetizable material, said magnetic pick-up head including a permanent magnetic pole piece secured to said permanent magnet, a coil wound on said pole piece, and means connected to said coil and responsive to the changes in magnetic flux occasioned by movement of said rotor past said pole piece and producing an indication of the speed of said rotor.

References Cited by the Examiner

UNITED STATES PATENTS

| 1,670,308 | 5/28 | Marden | 73—229 |
| 2,590,761 | 3/52 | Edgar | 308—237 |
| 2,812,661 | 11/57 | Cox | 73—231 |
| 3,002,384 | 10/61 | MacDonald | 73—231 |
| 3,053,087 | 9/62 | Waugh | 73—231 |

FOREIGN PATENTS 606,278　8/48　Great Britain.

RICHARD C. QUEISSER, *Primary Examiner.*

C. A. CUTTING, JOSEPH P. STRIZAK, *Examiners.*